(12) United States Patent
Ichapurapu et al.

(10) Patent No.: US 10,574,316 B1
(45) Date of Patent: Feb. 25, 2020

(54) ANTENNA SWITCHING FOR DEVICE WITH MULTIPLE ANTENNAS

(71) Applicant: Amazon Technologies, Inc., Seattle, WA (US)

(72) Inventors: Ravi Ichapurapu, Morgan Hill, CA (US); Shao-Cheng Wang, Santa Clara, CA (US); Vipul Jain, Union City, CA (US); Kun Ting Tsai, Fremont, CA (US); Milos Jorgovanovic, Mountain View, CA (US); Chirag Saurabh Bhavsar, Santa Clara, CA (US); Vinay Gotnakodlu Hegde, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/987,684

(22) Filed: May 23, 2018

(51) Int. Cl.
*H04B 7/06* (2006.01)
*H04W 4/80* (2018.01)
*H04W 8/00* (2009.01)
*H04B 17/318* (2015.01)
*H04W 84/12* (2009.01)

(52) U.S. Cl.
CPC ......... *H04B 7/0608* (2013.01); *H04B 17/318* (2015.01); *H04W 4/80* (2018.02); *H04W 8/005* (2013.01); *H04W 84/12* (2013.01)

(58) Field of Classification Search
CPC .......................... H04B 1/0064; H04B 7/0608
See application file for complete search history.

(56) References Cited

U.S. PATENT DOCUMENTS

| | | | | |
|---|---|---|---|---|
| 2009/0262042 | A1* | 10/2009 | Li | H04B 1/0064 343/876 |
| 2014/0253386 | A1* | 9/2014 | Sun | G01S 5/021 342/387 |
| 2016/0128114 | A1* | 5/2016 | Moy | H04W 8/005 455/434 |
| 2016/0182118 | A1* | 6/2016 | Lam | H03H 2/005 455/78 |
| 2016/0269356 | A1* | 9/2016 | Basnayake | H04L 61/2015 |
| 2016/0381557 | A1* | 12/2016 | Deng | H04L 63/107 726/4 |

* cited by examiner

*Primary Examiner* — Hsinchun Liao
(74) *Attorney, Agent, or Firm* — Quarles and Brady LLP

(57) ABSTRACT

A device includes a first radio controller, a second radio controller, and a processor. The processor is configured to execute instructions for determining that a first signal strength of a signal received from a remote device by a first antenna electrically connected to the first radio controller is less than a minimum signal strength threshold for communications using the first antenna, identifying a network process configured to communicate with a remote device using the first radio controller or the second radio controller, and determining that the processor is not executing the network process. The processor is further configured to execute instructions for, determining a second signal strength of a second signal received from the remote device by a second antenna, determining the second signal strength is greater than the first signal strength, and causing the first radio controller to communicate using the second antenna.

20 Claims, 8 Drawing Sheets

US 10,574,316 B1

ANTENNA SWITCHING FOR DEVICE WITH MULTIPLE ANTENNAS

BACKGROUND

The present invention relates generally to the field of electronic devices and, more particularly, to approaches for antenna selection in devices having multiple antennas. An increasing number of devices are configured to connect to networks in order to exchange information. In many cases, a single device may include a number of different radio controllers to enable simultaneous communications using a number of different protocols. For example, a typical device may include radio controllers enabling simultaneous communication using BLUETOOTH and wireless fidelity (WIFI) (e.g., 802.11) communication protocols.

To facilitate communications, a particular device may include a number of different antennas. If one antenna is experiencing poor communication conditions, a second antenna may be experiencing improved communication conditions. Upon detecting that communication conditions via the first antenna have deteriorated, a communication controller within the device can switch to using the second antenna for future communications.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
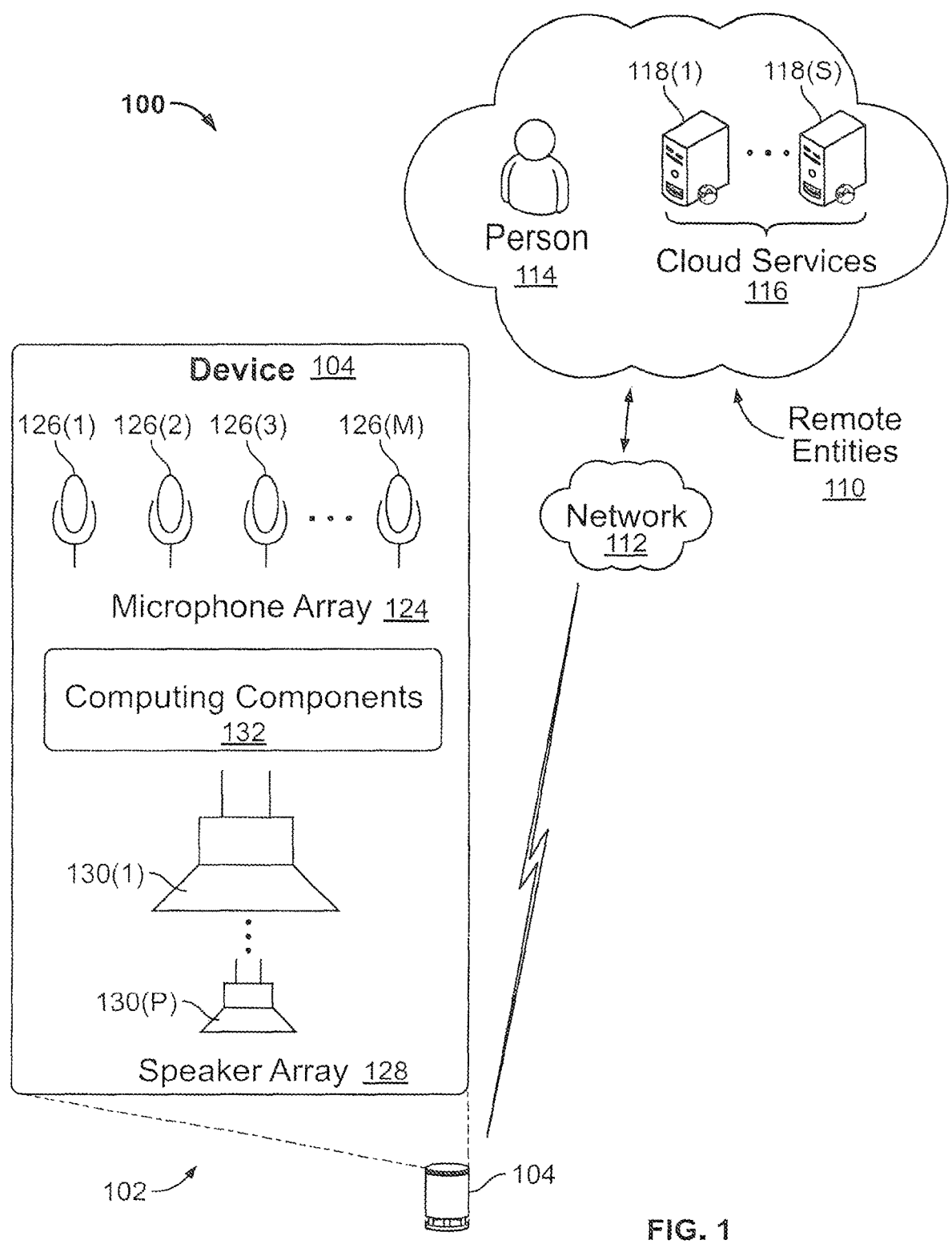
FIG. 1 depicts an exemplary environment including a device incorporating a communication subsystem configured in accordance with the present disclosure.

In many instances, an electronic device may utilize a number of different wireless communications protocols to transmit and receive data. For example, a network-connected speaker or smart phone device may simultaneously communicate using WIFI and BLUETOOTH communication protocols. Typically, each communication protocol is allocated a particular bandwidth (i.e., a range of frequencies) for wireless signal transmission and reception. The bandwidth for each protocol is allocated according to international standards.

To facilitate wireless communications using a particular communication protocol, a device may include two or more antennas. The antennas can be distanced apart from one another and may have different orientations within the device so as to provide diversity between the antennas. As such, if one antenna is not well-positioned to receive and/or transmit wireless communications to a remote device or access point (e.g., a connected wireless router or modem)—perhaps the antennas is at a bad angle to receive communications from the remote device—there is a reasonable likelihood that another antenna within the device is better positioned for such communications.

In a conventional device, antenna selection is performed by a radio controller at the physical layer within the wireless communications stack. That is, the radio controller is implemented by the hardware and software directly responsible for transmitting and receiving radio frequency (RF) signals via the device's antennas. During communications using a particular antenna, the radio controller monitors communication conditions on that antenna. This may involve the radio controller monitoring the received signal strength indicator (RSSI) and signal-to-noise ratio (SNR) for communications received by that first antenna. If the communications conditions (e.g., the RSSI or SNR) fall below a particular quality threshold, the radio controller may implement an antenna switch in which the radio controller identifies a different antenna to use for the ongoing wireless communications. As an example, the radio controller may sample RSSI for both a current antenna (i.e., the antenna that is currently in-use) and an alternate antenna. If the sampled RSSI on the alternate antenna is greater than that of the current antenna, the radio controller will switch to using the alternate antenna for ongoing communications.

In conventional devices, because the radio controller operates at the physical layer of the wireless communications stack, the radio controller may switch antennas without consideration of the status of activities higher up the communications stack. Being at the physical layer, conventional radio controllers have no knowledge of such activities. As such, the radio controller may decide to switch antennas when there are in process network-level activities such as Dynamic Host Configuration Protocol (DHCP) in which a network interface is allocated an Internet protocol (IP) address, BLUETOOTH device pairing process, and video or audio streaming. The switching of antennas during these network-level activities can cause significant user experience impact such as increasing the time required to obtain an IP address via DHCP, BLUETOOTH pairing failure, and video and audio streaming glitches.

Accordingly, a condition may exist within a device where, even though the current antenna may be providing sub-optimal communication conditions, network-level activities can still be performed using the current antenna. But, should the radio controller elect to initiate an antenna switch in an attempt to improve communication conditions, that antenna switch, even if it results in marginally improved communication conditions, will cause excessive delay (and potential failure) of the in process network-level activity. Accordingly, it may be preferable to delay antenna switches when such network-level activities are in process.

To reduce occurrences of such delays, the present device provides a controller or processor implementing an improved antenna switching algorithm. Specifically, the controller is configured to, before implementing an antenna switch, determine a status of network-level activities that may be disrupted should an antenna switch occur. For example, before implementing an antenna switch, the controller may determine whether an ongoing DHCP operation is taking place, a BLUETOOTH low-energy (BLE) profile is active, or if a speech-to-text activity is being undertaken. If such network-level activities are currently in process, the controller may delay or modify the procedure utilized to perform antenna switching so as to avoid disruption of the network-level activity.

Specifically, a set of defined network-level activities are generated. The defined network-level activities could include pre-defined activities that may occur at any level within the network stack and utilizing any communication protocol implemented by the device. For example, certain activities performed by the device at the application layer of the wireless communications stack could be included in the defined network-level activities. Such activities may include network-related operations such as, DHCP operations, BLUETOOTH pairing process activities, and WIFI protected access (WPA) handshake operations (e.g., WPA four-way handshake or group key handshake operations). Additionally, defined network-level activities could include certain application activities, such as the streaming of video and/or audio data, the establishing of certain BLUETOOTH protocols, or configuration of whole home audio sessions.

With a set of defined network-level activities defined, the controller can, before initiating antenna switching, determine whether one or more of the defined network-level activities is in process. Then, based upon that determination, the controller can select a particular approach for performing an antenna switch. If no defined network-level activities are in process, the controller may use a conventional algorithm for antenna switching. But if defined network-level activities are in process, the controller may implement a different algorithm for antenna switching that is configured to avoid disrupting or interfering with the defined network-level activities.

In conventional devices that have multiple antennas and implement multiple communication protocols (e.g., WIFI and BLUETOOTH), only a single antenna may be active at a time, with all radio controllers in the device using the same antenna for communications. If the device's controller implements an antenna switch, all protocols will begin communicating through the new antenna at the completion of the switch operation—only one antenna is used at a time. Consequently, it is possible that an antenna switch, while improving the communication conditions for one protocol could, in fact, deteriorate the conditions for another communication protocol. Accordingly, in an embodiment, the present device incorporates a switching mechanism between the controller (and, specifically, the device's radio controllers) and the device's multiple antennas to allow different antennas to be utilized for communications using different protocols. In a device implementing two communication protocols, for example, the switching mechanism may be implemented as a double-pole double-throw switch that allows the controller to selectively couple different antennas with the signal paths associated with different communication protocols.

FIG. 1 shows an illustrative architecture 100, set in an exemplary environment 102, which includes a device 104 that can incorporate a communication subsystem configured in accordance with the present disclosure. Specifically, the communication subsystem may be configured to implement antenna switching with consideration of defined network-level activities.

Device 104 may be positioned in any number of locations (e.g., ceiling, wall, in a lamp, beneath a table, on a work desk, in a hall, under a chair, etc.) within the environment 102. Device 104 is configured to communicatively couple to a number of remote entities 110 over a network 112. The remote entities 110 may include individual people, or automated and remote computer systems (not shown) that can interact with device 104. In some embodiments, remote entities 110 may comprise cloud services 116 hosted, for example, on one or more servers 118(1) . . . 118(S). These servers 118(1)-(S) may be arranged in any number of ways, such as server farms, stacks, and the like that are commonly used in data centers.

The cloud services 116 generally refer to a network accessible platform implemented as a computing infrastructure of processors, storage, software, data access, and so forth that is maintained and accessible via a network such as the Internet. Cloud services 116 do not require end-user knowledge of the physical location and configuration of the system that delivers the services. Common expressions associated with cloud services include "on-demand computing", "software as a service (SaaS)", "platform computing", "network accessible platform", and so forth.

The cloud services 116 may host any number of applications that can process input received from device 104, and produce a suitable response. Example applications might include web browsing, online shopping, banking, email, work tools, productivity, entertainment, educational, and so forth.

A user can communicate with remote entities 110 via device 104. For example, device 104 may output an audible question, "What do you want to do?" This output may represent a question from a far end talker 114, or from a cloud service 116 (e.g., an entertainment service). The user can then respond by stating a response.

Device 104 is equipped with an array 124 of microphones 126(1) . . . 126(M) to receive the voice input from the user. The microphones 126(1)-(M) are generally arranged at a first or top end of device 104. Although multiple microphones are illustrated, in some implementations, device 104 may be embodied with only one microphone.

Device 104 may further include a speaker array 128 of speakers 130(1) . . . 130(P) to output sounds. Speakers 130(1)-(P) may be configured to emit sounds at various frequency ranges, so that each speaker has a different range. In this manner, device 104 may output high frequency signals, mid frequency signals, and low frequency signals.

Device 104 may further include computing components 132 that process voice inputs received by microphone array 124, enable communication with the remote entities 110 over the network 112, and generate audio to be output by speaker array 128. Computing components 132 are generally positioned between microphone array 124 and speaker array 128, although essentially any other arrangement may be used. One collection of computing components 132 are illustrated and described with reference to FIG. 2.

Figure 2:
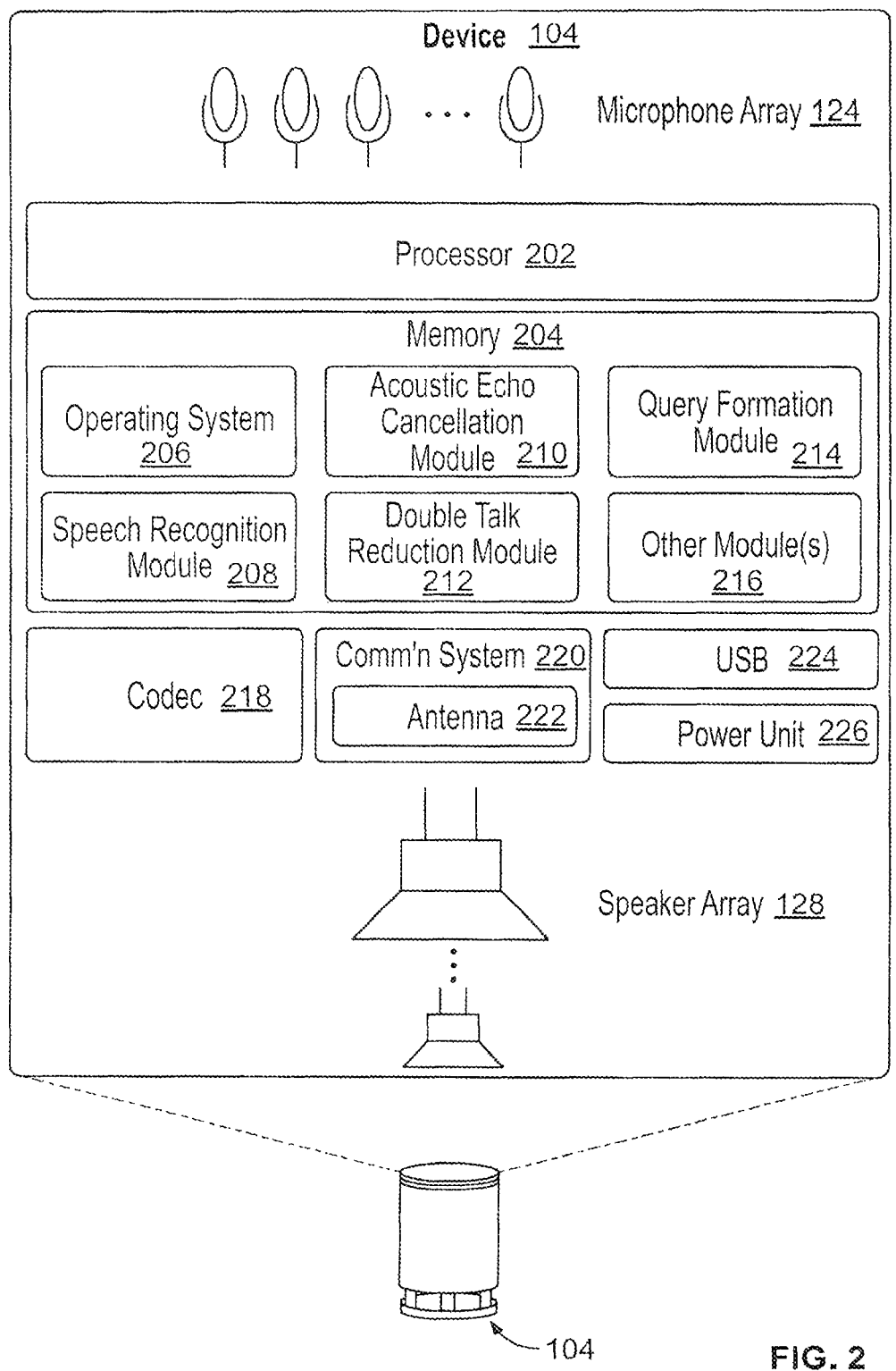
FIG. 2 illustrates example components of an example electronic device that can be used in accordance with various embodiments.

FIG. 2 shows selected functional components of device 104 in more detail. Generally, device 104 may be implemented as a standalone device that is relatively simple in terms of functional capabilities with limited input/output components, memory and processing capabilities. For instance, device 104 may not have a keyboard, keypad, or other form of mechanical input. Nor does device 104 necessarily require a display or touch screen to facilitate visual presentation and user touch input. Instead, device 104 may be implemented with the ability to receive and output audio, a network interface (wireless or wire-based), power, and limited processing/memory capabilities.

In the illustrated implementation, device 104 includes microphone array 124, speaker array 128, processor 202, and memory 204.

Memory 204 may include computer-readable storage media ("CRSM"), which may be any available physical media accessible by the processor 202 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and that can be accessed by processor 202.

Several modules such as instructions, data stores, and so forth may be stored within the memory 204 and configured to execute on processor 202. An operating system module 206 is configured to manage hardware and services (e.g., wireless unit, USB, Codec) within and coupled to device 104 for the benefit of other modules. Several other modules may be provided to process verbal input from the user. For instance, a speech recognition module 208 provides some level of speech recognition functionality.

An acoustic echo cancellation module 210 and a double talk reduction module 212 can be provided to process the audio signals to substantially cancel acoustic echoes and substantially reduce double talk that may occur. These modules may work together to identify times where echoes are present, where double talk is likely, where background noise is present, and attempt to reduce these external factors to isolate and focus on the near talker.

A query formation module 214 may also be provided to receive the parsed speech content output by the speech recognition module 208 and to form a search query or some form of request. This query formation module 214 may utilize natural language processing (NLP) tools as well as various language modules to enable accurate construction of queries based on the user's speech input.

Device 104 might further include a codec 218 coupled to the microphones of the microphone array 124 and the speakers of the speaker array 128 to encode and/or decode the audio signals. The codec 218 may convert audio data between analog and digital formats.

Device 104 includes a wireless communication system 220 coupled to an antenna system 222 (which may include one or more separate antenna components) to facilitate a wireless connection to a network or one or more other remote components configured to communicate with device 104. Wireless communication system 220 may implement one or more of various wireless communication protocols, such as WIFI, BLUETOOTH, ZIGBEE, and so on.

USB port 224 may further be provided as part of device 104 to facilitate a wired connection to a network, or a plug-in network device that communicates with other wireless networks. In addition to USB port 224, or as an alternative thereto, other forms of wired connections may be employed, such as a broadband connection, and connected to device 104 using one or more additional modules 216 that may be utilized for data transfer. A power unit 226 is further provided to distribute power to the various components of device 104.

Device 104 supports audio interactions with the user, in the form of receiving voice commands (e.g., words, phrase, sentences, etc.) from the user and outputting audible feedback to the user. Accordingly, in the illustrated implementation, there are no haptic input devices, such as navigation buttons, keypads, joysticks, keyboards, touch screens, and the like. Further there is no display for text or graphical output.

Figure 3:
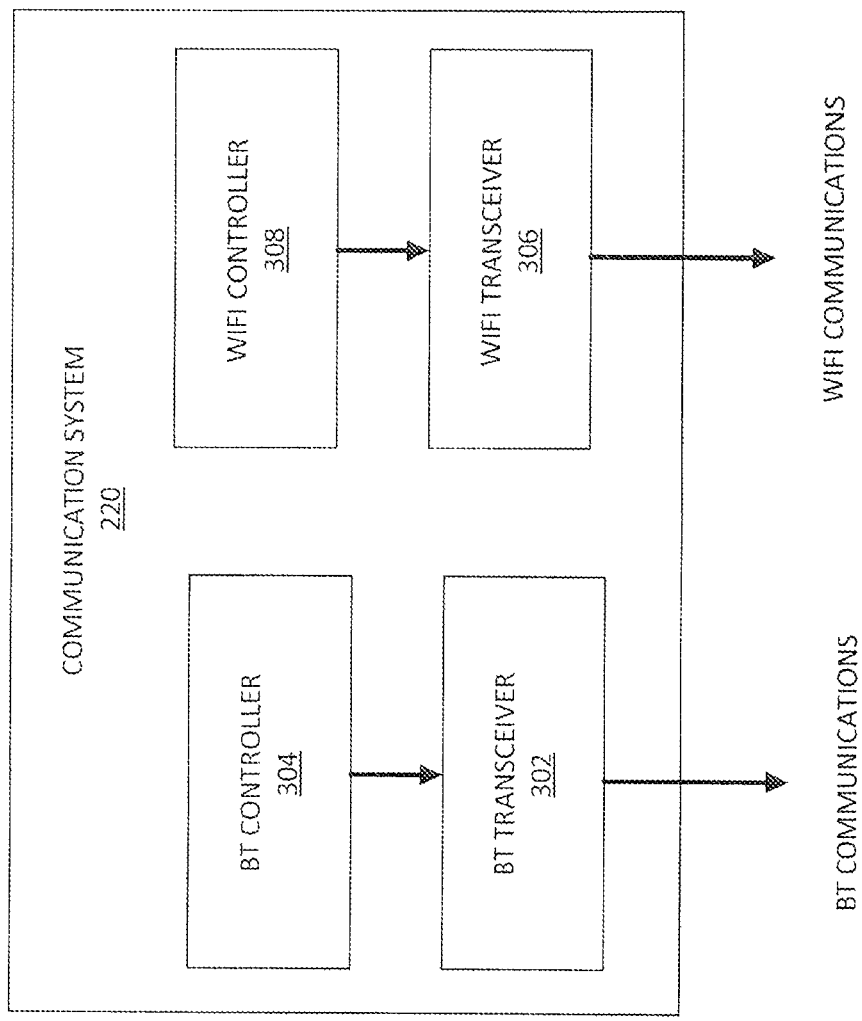
FIG. 3 is a block diagram depicting functional components of a communication subsystem of an example device.

FIG. 3 is a block diagram depicting functional components of communication system 220 of an example device (e.g., device 104 of FIGS. 1 and 2). In this example, communication system 220 includes subsystems for transmitting, receiving, encoding and decoding BLUETOOTH, and WIFI communications. Specifically, communication system 220 includes BLUETOOTH transceiver 302 that is configured to provide BLUETOOTH communication capability by transmitting BLUETOOTH packets using a suitable antenna (not shown) and receiving BLUETOOTH packets via the same antenna. BLUETOOTH controller 304 is coupled to the BLUETOOTH transceiver 302. BLUETOOTH controller 304 is configured to encode and decode BLUETOOTH communications that are either transmitted through BLUETOOTH transceiver 302 or received via BLUETOOTH transceiver 302. BLUETOOTH controller 304 is further configured to select an appropriate BLUETOOTH channel for the transmission or reception of a BLUETOOTH data packet and is configured to instruct BLUETOOTH transceiver 302 to utilize such BLUETOOTH channel when either transmitting or receiving packets. In some cases, as described herein, the selection of an appropriate channel for data transmission or reception may involve BLUETOOTH controller 304 executing one or more algorithms or routines to identify an appropriate channel.

During operation of the BLUETOOTH communication system, BLUETOOTH controller 304 may further monitor or control one or more attributes of data packets being transmitted or received via BLUETOOTH transceiver 302. For example, for data packets transmitted using a particular BLUETOOTH channel, BLUETOOTH controller 304 can set a duty cycle to be utilized when transmitting the data packet. Conversely, for data packets received by BLUETOOTH transceiver 302 in a particular channel, BLUETOOTH controller 304 can determine an RSSI for those communications. The RSSI is a measurement of the power of the received signal compared to background noise, which can be an indicator of how much interference is present on that particular channel.

Communication system 220 includes WIFI transceiver 306 that is configured to provide WIFI communication capability by transmitting WIFI packets using a suitable antenna (not shown) and receiving WIFI packets using the same antenna. WIFI controller 308 is coupled to the WIFI transceiver 306. WIFI controller 308 is configured to encode and decode WIFI communications that are either transmitted through WIFI transceiver 306 or received using WIFI transceiver 306. WIFI controller 308 is further configured to select an appropriate WIFI channel for the transmission or reception of WIFI data packets and is configured to instruct WIFI transceiver 306 to utilize such WIFI channel when either transmitting or receiving packets. In some cases, as described herein, the selection of an appropriate channel for data transmission or reception may involve WIFI controller 308 executing one or more algorithms or routines to identify an appropriate channel.

During operation of the WIFI communication system, WIFI controller 308 may further monitor or control one or more attributes of data packets being transmitted or received via WIFI transceiver 306. For example, for data packets transmitted using a particular WIFI channel, WIFI controller 308 can set a duty cycle to be utilized when transmitted the data packet. Conversely, for data packets received by WIFI transceiver 306 in a particular channel, WIFI controller 308 can determine an RSSI for those communications, which can be an indicator of how much interference or noise is present on that particular channel.

Figure 4:
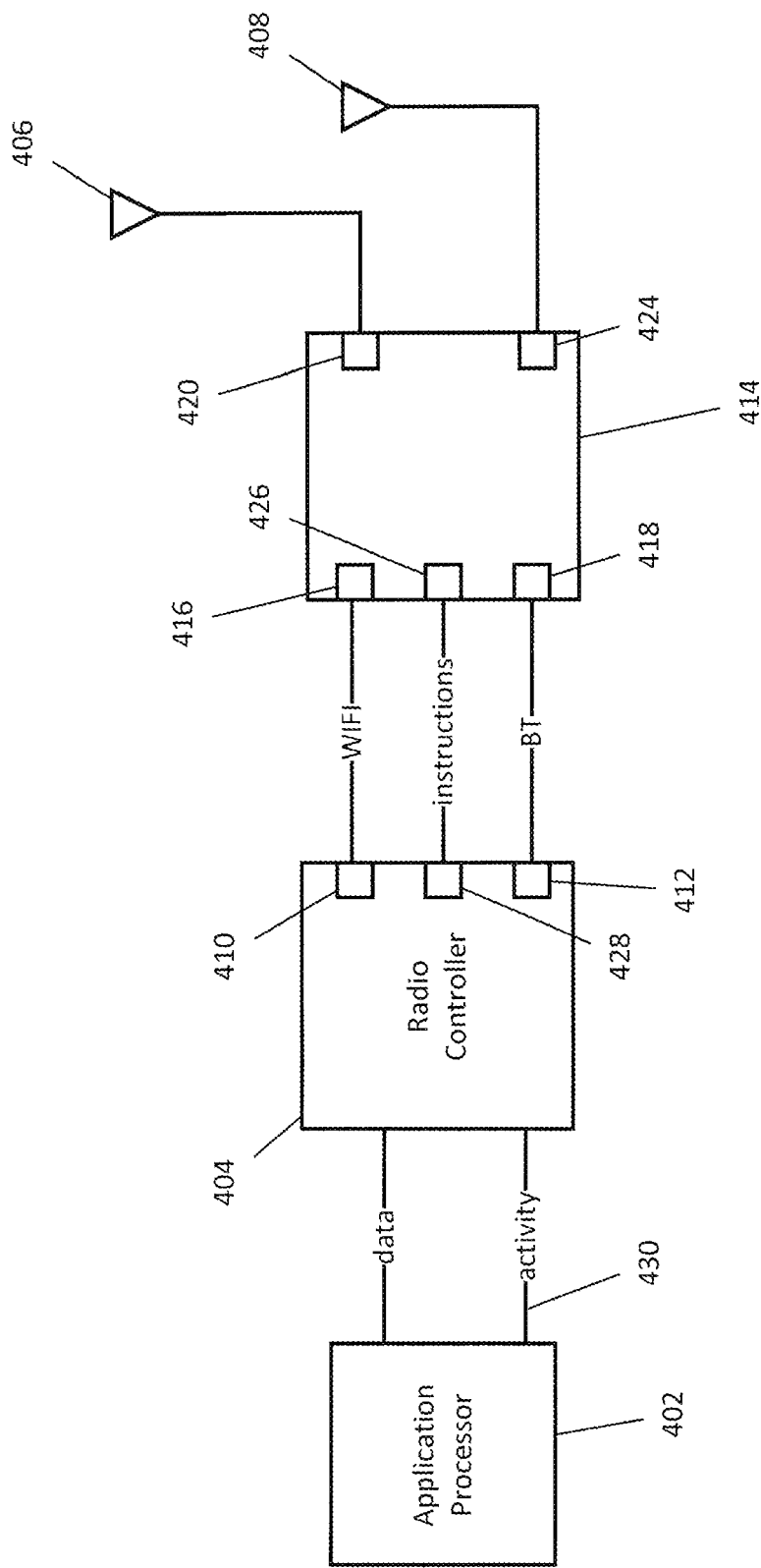
FIG. 4 is a block diagram depicting functional components of a wireless communication system of a device.

FIG. 4 is a block diagram depicting functional components of a wireless communication system of a device (e.g., device 104 of FIG. 1). The device includes an application processor 402 configured to implement the general functionality of the device. To provide that functionality, processor 402 (e.g., which may be part of or itself a controller) is configured for executing instructions that can be stored in a memory of the device. As would be apparent to one of ordinary skill in the art, the device can include many types of non-transitory and/or transitory memory, data storage, or non-transitory computer-readable storage media, such as a first data storage for program instructions for execution by processor 402, a separate storage for images or data, and a removable memory for sharing information with other devices, etc.

Processor 402 is configured to execute instructions stored in a memory to run programs stored therein. The programs may cause processor 402 to execute instructions to provide interactivity with a user of the device, such as by generating video or audio outputs at output systems (e.g., display screens and/or audio speakers) of the device and receiving input from a user via a suitable input device (e.g., a keyboard, touchscreen, joystick, voice inputs via a voice-to-text system, and the like). Additionally, processor 402 may execute instructions causing the device to communicate via one or more wireless communication protocol.

For example, processor 402 may execute instructions causing the device to connect to a wireless network to transmit data through that network to remote devices and to receive data transmissions from those remote devices. This may involve processor 402 executing instructions for first establishing a connection to the network. For example, when connecting to a WIFI network, this may involve processor 402 executing instructions for a DHCP process to connect to the network and cause the device to be associated with an IP address on the network. Then, as processor 402 continues to execute program instructions, processor 402 may utilize that network connection to transmit and receive data.

To facilitate wireless communications, the device includes radio controller 404. Radio controller 404 is configured to receive data to be transmitted from processor 402 and convert that data into a suitable format for broadcast via one or both of antennas 406 and 408. Accordingly, radio controller 404 operates at the physical hardware level to control the transmission and reception of wireless communication signals via antennas 406 and 408.

Typically, data received from processor 402 is encoded as binary data. Radio controller 404, upon receipt of that data is configured to convert the binary data into an encoded analog RF signal suitable for transmission to antenna 406 or 408 for broadcast wirelessly. Conversely, as encoded RF signals are received by one of antennas 406 or 408, those analog signals are received by radio controller 404. Radio controller 404 decodes the analog signals and converts them into binary-encoded data that can, in turn, be provided to processor 402. Upon receipt of the binary-encoded data, processor 402 can process the received data and take appropriate action.

In this example, radio controller 404 is configured to implement wireless communications using two different communications protocols—WIFI and BLUETOOTH. Both protocols require that data being transmitted or received using the protocol be encoded differently and, as such, radio controller includes two separate ports 410 and 412, one for each protocol. Port 410 provides for the transmission and reception of analog RF signals encoded for the WIFI protocol, while port 412 provides for the transmission and reception of analog RF signals encoded for the BLUETOOTH protocol.

Typically, data received by radio controller 404 from processor 402 will indicate which protocol should be utilized when processing the data to be transmitted wirelessly. Similarly, transmissions received by one of antennas 406 and 408 will be encoded so as to identify the protocol used to encode each transmission.

Radio controller 404 is connected to antennas 406 and 408 through switch 414. Switch 414 has two ports 416 and 418, corresponding to and connected to ports 410 and 412 of radio controller 404, respectively. Accordingly, port 416 of switch 414 is configured to receive WIFI-encoded signals from port 410 of radio controller 404. Similarly, port 418 of switch 414 is configured to receive WIFI-encoded signals from port 412 of radio controller 404. Switch 414 also includes output ports 420 and 424 connected, respectively, to antennas 406 and 408.

Switch 414 is implemented as a double-pole, double-throw switch. In this configuration, each input of switch 414 (i.e., ports 416 and 418) can selectively be connected to one of the outputs of switch 414 (e.g., ports 420 and 424). Accordingly, based upon the status of switch 414, the WIFI-encoded signal received at port 410 can be directed to either of antennas 406 and 408 while, at the same time, the BLUETOOTH-encoded signal received at port 418 can also be directed to either of antennas 406 or 408.

The operation of switch 414 is controlled by a control signal received at control input 426 of switch 414 from port 428 of radio controller 404. Accordingly, by transmitting an appropriate control signal to control input 426, radio controller 404 can set the state of switch 414 to select one of antennas 406 and 408 to be used for WIFI-encoded transmissions and, at the same time, one of antennas 406 and 408 to be used for BLUETOOTH-encoded transmissions.

This configuration of radio controller 404 and the incorporation of switch 414 into the output network of radio controller 404 can provide more flexibility for the device in how RF transmission are processed. In some conventional devices—even those that include multiple antennas—only a single antennas is used for all transmissions at a single time. If the device has multiple antennas, at any one time, only a single antenna is used for transmission and reception of wireless signals, regardless of the manner in which the signal is encoded.

Antennas 406 and 408 are configured for the transmission and reception of RF signals encoded in accordance with the communication protocols implemented by radio controller 404. Antennas 406 and 408 may include patch antennas, trace antennas, and the like. In an embodiment, antennas 406 and 408 are configured for the transmission and reception of WIFI and BLUETOOTH-encoded transmissions at frequencies including the 2.4 and 5 GHz bands allocated to WIFI and BLUETOOTH communications.

Generally, antennas 406 and 408 demonstrate some diversity so that in the event one of antennas 406 and 408 is experiencing poor communication conditions (e.g., low received-signal power levels and low SNR), the other of antennas 406 and 408 may be experiencing better communication conditions. Antennas 406 and 408 may, for example, be spatially diverse. In that case, antennas 406 and 408 may be of similar construction, but be physically separated from one another in the device.

Depending upon the characteristics of incoming signals, spatial distance of about one wavelength may be sufficient to give antennas 406 and 408 the required diversity. In some cases, antennas 406 and 408 may have pattern diversity, in which case the antennas have different radiation patterns. In that arrangement, antennas 406 and 408 may not be required to be significantly distanced from one another as their pattern diversity may suffice to provide sufficient diversity. In some cases, antennas 406 and 408 may exhibit other forms of diversity, such as polarization diversity, in which each antenna may have orthogonal or substantially orthogonal polarizations.

In order to determine which of antennas 406 and 408 to use when transmitting a particular WIFI or BLUETOOTH-encoded signal, radio controller 404 is configured to determine the communication conditions being experience by each of antennas 406 and 408. Specifically, radio controller 404 can determine a RSSI for each antenna, where the RSSI is a measurement of the power of signal received by the antenna compared to background noise. The RSSI can therefore be an indicator of how much interference is present on a particular channel for that antenna. The greater the RSSI, the better conditions are for communicating with that antenna. Similarly, radio controller 404 may determine a SNR for each antenna, where the SNR indicates a strength of the useful signal received by an antenna compared to background noise observed by the same antenna. Again, the greater the SNR the better conditions are for communicating using that antenna.

As discussed above, even though radio controller 404 can, by controlling switch 414, switch antennas to achieve better communication conditions, there are some circumstances where an antenna switch may be detrimental to the user experience. For example, radio controller 404 may decide to switch antennas during a defined network-level activity. The switching of antennas during these network-level activities can cause significant user experience impact such as increasing the time required to obtain an IP address via DHCP, BLUETOOTH pairing failure, and video and audio streaming glitches. This may occur even though the defined network-level activity could still be completed within a reasonable amount of time using the under-performing antenna. But, should the radio controller elect to initiate an antenna switch, that antenna switch, even if it results in marginally improved communication conditions, will cause excessive delay (and potential failure) of the defined network-level activity.

Accordingly, when application processor 402 is executing a defined network level activity, processor 402 is configured to notify (via signal line 430) radio controller 404 (or radio controller 404 is configured to determine by retrieving from processor 402 a description of ongoing network activities) that the activity is in process. Radio controller 404 uses that information to determine an appropriate time to initiate an antenna switch, should a switch be necessary or desirable.

As discussed above, defined network-level activities typically include a set of activities or network processes that may be performed or executed by application processor 402 that call for the transmission or reception of wireless communications. The network processes may include relatively low-level network activities such as DHCP or network association activities or higher-level application-level activities such as video or audio streaming, or specific BLUETOOTH operations. In short any network process that may be executed by application processor 402 that implements wireless communications using one of the device's radio controllers may be included in the set of defined network-level activities. Example activities or network processes that may be performed or executed by application processor 402 and listed as defined network-level activities may include communications occurring while specific BLUETOOTH profiles are in effect (e.g., an active hands free profile, an advanced audio distribution profile (A2DP), or a BLUETOOTH low energy (BLE) profile is in effect), BLUETOOTH pairing processes or inquiry activity, WIFI DHCP or WPA association activities, and the establishment of point-to-point networks using either WIFI or BLUETOOTH protocols. In some cases, user-level software activities may also be included as defined network-level activities, such as text-to-speech and speech-to-text activities, the streaming of video and/or audio content (e.g., via MIRACAST), active file downloads, etc.

In general, the list of defined network-level activities may include any activities that may be performed by application processor 402 that call for communications through any of the device's radio controllers using any communication protocols implemented by the device.

Application processor 402 is configured to store a table of defined network-level activities. An example is provided below. The table lists each defined activity and may, for each activity, identify the communication protocol that is associated with such activity. Although it is not anticipated that the listing of defined network-level activities will change frequently, it is contemplated that the listing could be updated or changed over time for a particular device, perhaps as the device implements new features or system changes occur.

TABLE 1

| Protocol | Defined Network-Level Activity |
| --- | --- |
| WIFI | DHCP ongoing |
| WIFI | Video streaming activity |
| WIFI | Audio streaming activity |
| BLUETOOTH | Hands-free profile in effect |
| BLUETOOTH | BLUETOOTH pairing activity |

Although in FIG. 4, application processor 402 and radio controller 404 are depicted as two separate functional blocks, it should be understood that the functionality of application processor 402 and radio controller 404 could be provided by any number of distinct functional components. Network level-activities could, for example, be performed or implemented by any number of processors and/or controllers within the device, with each such processor or controller notifying radio controller 404 of any such activities that are in process. Similarly, the functionality of radio controller 404 could be provided by multiple components, perhaps with different processors performing encoding and decoding activities for communications according to different protocols. As such, radio controller 404 may include a number of separate radio controllers handling the encoding and decoding schemes for different communication protocols (e.g., separate WIFI and BLUETOOTH radio controllers). In some cases, the functionality of application processor 402 and radio controller 404 could be combined into a single processor unit.

Figure 5:
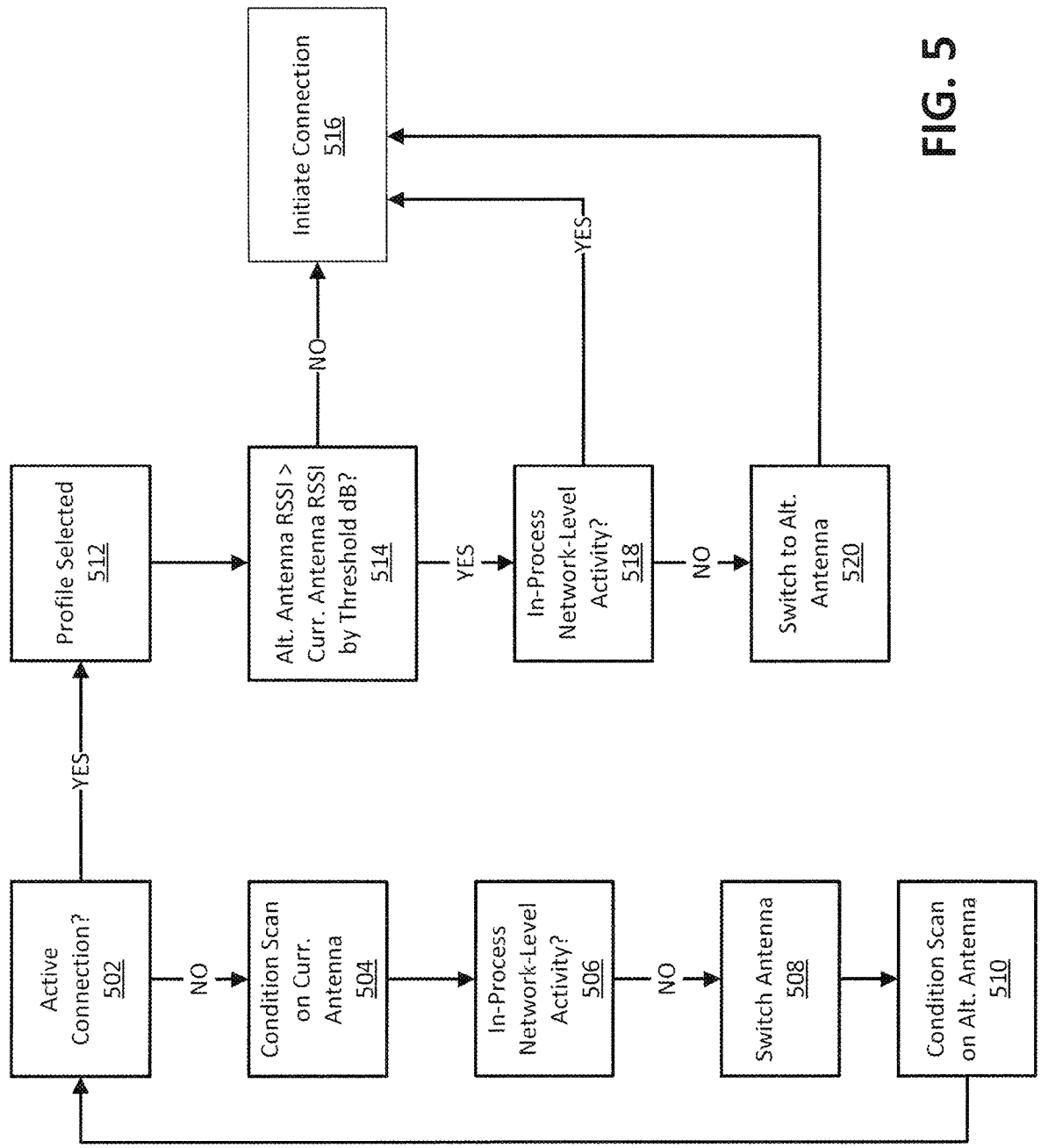
FIG. 5 is a flowchart depicting a method for implementing antenna switching that may be at least partially executed by a processor or controller within a device.

To facilitate antenna switching, FIG. 5 is a flowchart depicting a method 500 for implementing antenna switching that may be at least partially executed by a processor or controller within a device (e.g., processor 402 and/or radio controller 404 of FIG. 4). Method 500 is described in terms of the method being at least partially executed by a WIFI radio controller, but it should be understood that method 500 may alternatively be at least partially implemented by a radio controller for a different communication protocol, such as a BLUETOOTH radio controller. In still other embodiments, the method may be implemented at least partially by radio controller implementing alternate communication protocols, such as ZIGBEE. In describing method 500, reference is made to a "current" antenna and an "alternate" antenna. In this description, the current antenna is the antenna that is currently active (i.e., in electrical communication with the device's radio controller). The alternate antenna is a device antenna that is electrically disconnected from the device's radio controller upon initial execution of the method, but the device's radio controller may switch to the alternate antenna (i.e., electrically disconnect the current antenna and electrically connect to the alternate antenna to the device's radio controller) while executing the method, as described below.

In step 502, the device controller determines that there is no active connection established via the current communication protocol (in this example, WIFI). The determination may be made by the controller itself, via access to a look-up table storing status information for connections using the current communication protocol. Or, alternatively, an application processor (e.g., application processor 402 of FIG. 4) may provide information to a radio controller indicating the current status of existing connections established via the communication protocol.

Having determined that there is no active connection using the communication protocol, the controller initiates monitoring of radio conditions for each antenna in the device (e.g., antennas 406 and 408) so that up-to-date antenna communication condition data is available should a connection be initiated—in which case the antenna experiencing the best communication conditions may be utilized for establishing the connection on ongoing communications using the connection.

Accordingly, in step 504 the controller initiates an antenna condition check on the currently-selected antenna. The condition check generally evaluates the communication conditions (e.g., the quality of the wireless communication link through the antenna with an access point) for a current antenna (e.g., antenna 406) of the device. An access point may be a wireless router or modem that routes communications received from the device to other remote devices, for example, via the Internet. The condition check may involve any suitable process for evaluating the communication conditions for the current antenna. Such checks may involve the controller transmitting probe messages via the antenna and receiving probe message responses, where the probe message responses include condition data (or from which condition data can be derived). In some cases, the condition check may involve the controller receiving beacon transmissions from nearby access points using the current antenna, where the beacon transmissions include condition data (or from which condition data can be derived)—this typically occurs for passive channels. Upon receipt, both the probe responses and, optionally, the beacon messages may be used to determine communication conditions to a number of access points that were detected during the scanning process of step 504.

These conditions may be expressed, for example, as a particular received signal strength (encoded as an RSSI) or SNR for the current antenna for a number of different access points, for example. Table 2, below, shows an example set of communication conditions that may be captured by the radio controller for the current antenna according to step 504.

TABLE 2

| Antenna | Base Station ID | RSSI (decibels) |
|---|---|---|
| Current Antenna | A1234 | −57 |
| Current Antenna | B2345 | −62 |
| Current Antenna | C3456 | −125 |
| Current Antenna | D4567 | −48 |

At the conclusion of step 504, communication conditions for the current antenna have been determined. Typically the condition data is encoded in values such as an RSSI or a SNR. The values are stored by the controller in a suitable storage memory for later user. In situations where multiple RSSI measurements are captured over time for the same base station, the multiple RSSI measurements may be averaged so as to reduce the effect of outlier or inaccurate RSSI measurements on antenna selection.

After evaluating the communication conditions for the current antenna, before switching to the device's alternate antenna to measure the alternate antenna's communication conditions, in step 506 an evaluation is performed to determine whether a defined network-level activity is in process. As discussed above, this evaluation may involve a radio controller (e.g., radio controller 404) communicating with an application processor (e.g., application processor 402) to determine whether such a defined activity is in process—as discussed above, defined network-level activities may be include activities performed by the application processor.

Generally, step 506 involves determining whether any defined network-level activities are in process, where the activities are associated with protocols that could be affected by the upcoming antenna switch. As such, in a device where all communication protocols are tied together so that all protocols use the same antenna at the same time, such an antenna switch could potentially affect all protocols. Accordingly, in that case, step 506 involves determining whether any of the defined network-level activities are in process (i.e., all activities defined within Table 1, above).

If, however, the device includes a DPDT switch, such as switch 414 of FIG. 4, an antenna switch may not affect communications using all protocols of the device. For example, in a device that implements both WIFI and BLUETOOTH protocols, but also includes a switch enabling antenna switches to be performed for only a single protocol, step 506 may only involve determining whether defined network-level activities are in process for the protocol being switched. If, for example, method 500 is implemented for WIFI communications for such a device, step 506 may only involve checking whether the defined network-level activities listed in Table 1 that are also associated with the WIFI protocol are in process. In that case, activities associated with the BLUETOOTH protocol will not be evaluated.

To facilitate determining whether a particular defined network-level activity is in process, each activity may be associated with a particular process or executable file within the device. In that case, to determine whether a particular activity is in process, the controller may determine whether the process or executable file has been executed and is currently running within the device (e.g., by application processor 402). In other examples, each activity may be associated with a particular program. The program may include an application program interface enabling an application processor (e.g., application processor 402) to access the application program interface to determine whether the program is executing the specific activity. In still other embodiments, the table storing the listing of defined network-level activities may identify a particular log file that an application processor may access to determine whether the activity is in process.

In a specific example, if a DHCP process is defined as a network-level activity, application processor 402 may be configured to interface with a DHCP daemon configured to implement the DHCP process. By directly inspecting the DHCP daemon (e.g., via an API), the application processor 402 can determine whether DHCP is in process. Similarly, application processor 402 may determine whether a network-level activity of a WPA handshake is in processor by listening for wpa_supplicant events that signal an initiation of a layer-2 association, a completion of layer-2 association, and a completion of the WPA handshake. To identify whether BLUETOOTH-related network-level activities are in-process, application processor 402 can be configured to directly inspect (e.g., via a suitable API call) the device's BLUETOOTH subsystem to determine whether a defined BLUETOOTH profile has been instantiated—indicating that a particular network-level activity is in process. Similarly, to determine whether a whole home audio (WHA)-related network-level activity is in process, application processor 402 may be configured to inspect the device's WHA state machine to determine whether a WHA distribution session is in process.

If a defined network-level activity is in process, the scanning process is interrupted and the method returns to step 502 to determine whether there is an active connection using the current communication protocol. If no defined network-level activities are underway, the method move to step 508.

In step 508 the controller switches to a different, alternate antenna. If, the current antenna of step 504 is equivalent to antenna 406 of FIG. 4, the alternate antenna may be equivalent to antenna 408. The controller may switch to the alternate antenna by activating a switch that electrically connect an output of the controller to the alternate antenna. After switching to using the alternate antenna (e.g., via modification of the state of switch 414 of FIG. 4), in step 510 the controller performs a condition check for the alternate antenna. The process for checking communication conditions of the alternate antenna may be similar to those used in step 504 to check the communication conditions of the first antenna.

At the conclusion of step 510, the controller has stored a listing of communication conditions (e.g., encoded into a value such as RSSI and SNR) for a number of access points in proximity to the device for the alternate antenna. Table 3, below, shows an example set of conditions that may be captured by the radio controller for the alternate antenna according to step 510.

TABLE 3

| Antenna | Base Station ID | RSSI |
|---|---|---|
| Alternate Antenna | A1234 | −55 |
| Alternate Antenna | B2345 | −60 |
| Alternate Antenna | C3456 | −98 |
| Alternate Antenna | D4567 | −44 |

Accordingly, at the completion of step 510, the controller has evaluated communication conditions for each antenna (e.g., the current and alternate antenna) and has stored values (e.g., RSSI or SNR values) describing each for later use. In situations where multiple RSSI measurements are captured over time for the same base station, the multiple RSSI measurements may be averaged so as to reduce the effect of outlier or inaccurate RSSI measurements on antenna selection.

It should be noted that this algorithm presumes the device has two antennas. If the device includes three or more antennas, additional steps could be added after step 510 to include condition checks for each of the available antennas. In that case, each condition check would be preceded by a confirmation step that no defined network-level activities are in process. If, at any time, defined network-level activities are determined to be in process, the condition check process would be interrupted with the method returning to step 502.

Steps 504, 506, 508, and 510 will keep repeating in a loop to generate updated communication condition data for each antenna of the device as long as no connection is detected in step 502 and no defined network-level activities are detected in step 506.

If, in step 502 it is determined that a connection is detected, the method moves to step 512 in which a particular connection profile is selected for the connection. The connection profile will identify the access point to which the connection is being made. Given that the profile identifies the access point, in step 514 the controller can access the connection condition records stored by the combination of steps 504 and 510 (e.g., stored in Table 2 and Table 3) to determine whether to use the current antenna or the alternate antenna for communications with the access point identified by the selected profile.

Accordingly, in step 514, if such condition records are available, the controller determines whether the alternate antenna's communication conditions are better than those of the current antenna. This may involve comparing the RSSI observed for the access point on both antennas to determine which RSSI has a higher value (indicating that antenna should be used for the connection). In some cases, however, it may not be sufficient that the alternate antenna have a greater RSSI to warrant a switch because switching antennas does take some time. Accordingly, step 514 may involve determining whether the communication conditions on the alternate antenna exceed those of the current antenna by a threshold value in order to warrant switching to the alternate antenna. For example, the controller may make this determination by evaluating whether the RSSI observed for the access point is at least 3 dB (though other values, such as 5 dB or 10 dB may be utilized) greater for the alternate antenna than the current antenna. If not, indicating that the communication conditions on the alternate antenna are not sufficiently better than those of the current antenna to warrant an antenna switch, in step 516, the controller begins establishing a communication connection to the access point according to the profile selected in step 512 on the current antenna.

But if in step 514 the controller determines that the alternate antenna has better communication conditions with the access point identified in the profile than the current antenna, the controller will attempt switch to that antenna. Before doing so, however, in step 518 the controller again determines whether any defined network-level activities are in process. Again, this step may involve a radio controller communicating with an application processor to learn of any such activities in a similar manner to that used in step 506. If such activities are underway, the controller skips the antenna switch process and begins initiating the connection using the current antenna. But if no defined network-level activities are in process, in step 520 the controller switches antenna to the alternate antenna and then, in step 516, initiates the network connection using that antenna.

Figure 6:
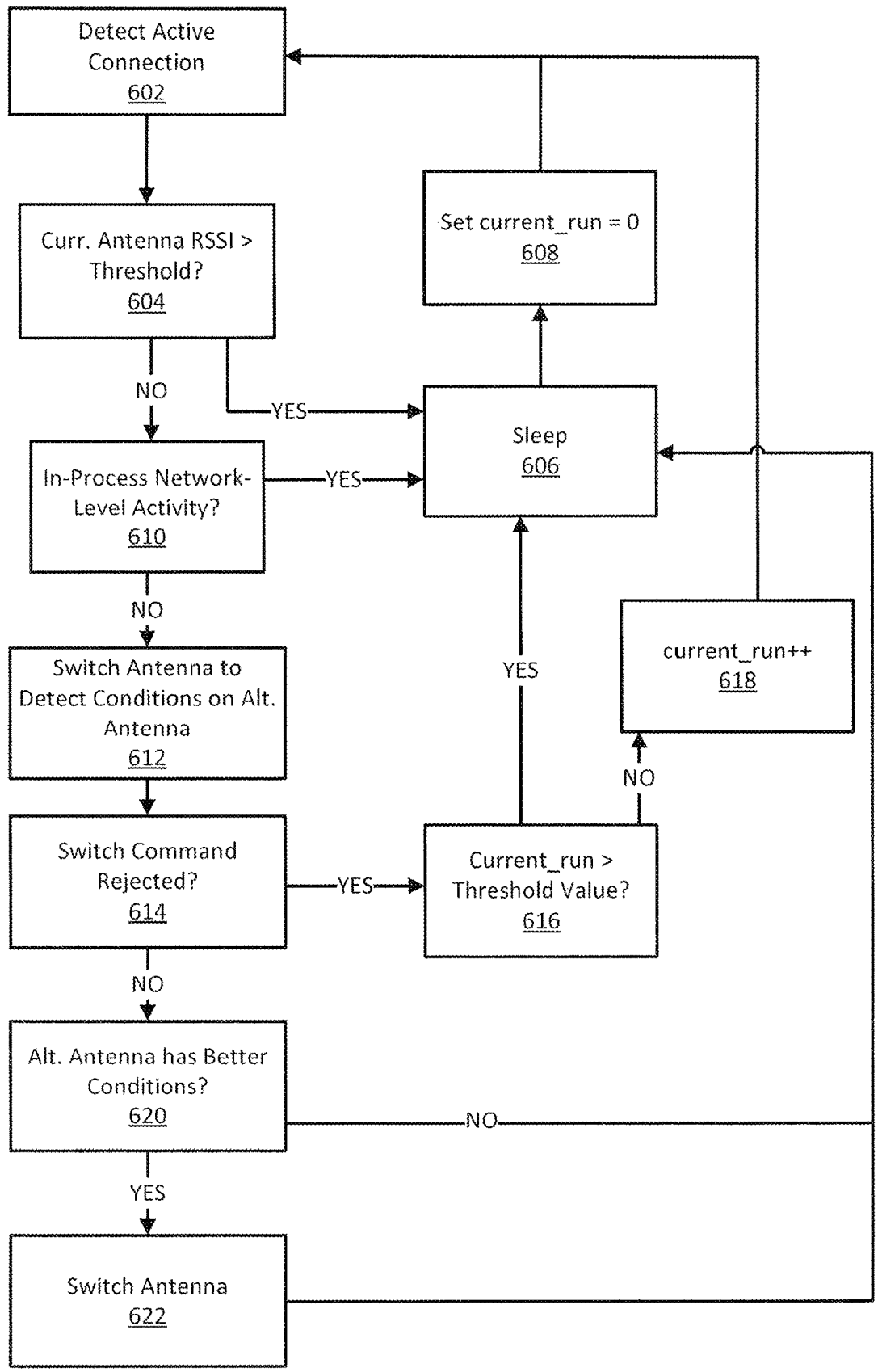
FIG. 6 is a flowchart depicting a method for implementing antenna switching that may be executed during an on-going communication connection.

If the device already has an established network connection, a different process may be used to evaluate the communication conditions on the current antenna (i.e., the in-use antenna) and determine whether an antenna switch is warranted. FIG. 6 is a flowchart depicting a method 600 for implementing antenna switching that may be at least partially executed by a processor or controller (e.g., processor 402 and/or radio controller 404 of FIG. 4) during an on-going data connection. Method 600 is described in terms of the method being at least partially executed by a WIFI controller, but it should be understood that method 600 may alternatively be implemented by a controller for a different communication protocol, such as a BLUETOOTH protocol. In still other embodiments, the method may be implemented at least partially by radio controller implementing alternate communication protocols, such as ZIGBEE. In describing method 600, reference is made to a "current" antenna and an "alternate" antenna. In this description, the current antenna is the antenna that is currently active (i.e., in electrical communication with the device's radio controller). The alternate antenna is a device antenna that is electrically disconnected from the device's radio controller upon initial execution of the method, but the device's radio controller may switch to the alternate antenna (i.e., electrically disconnect the current antenna and electrically connect to the alternate antenna to the device's radio controller) while executing the method, as described below.

In step 602, it is determined that there is an active connection established via the communication protocol (in this example, WIFI) and that the device is connected to an access point. In an embodiment, determine whether there is an active connection may include accesses a network interface to determine a current state of that interface and further determining whether the current state indicates the existence of an active connection. For example, if a network interface's state is one of in-process authentication, verification, or security handshake, such a state may indicate the existence of an active connection. Additionally, if the network interface's state is associated, such a state may indicate the existence of an active connection. The determination may be made by the controller itself, via access to a look-up table storing status information for connections using the current communication protocol. Or, alternatively, an application processor (e.g., application processor 402 of FIG. 4) may provide information to the controller indicating the current status of existing connections established via the communication protocol. If an active connection is established the device is actively connected to an access point.

Having confirmed that there is an active connection using the communication protocol, in step 604 the controller determines whether the communication conditions on the current antenna (e.g., an RSSI for packets received via the current antenna) exceeds a particular pre-determined threshold. The threshold may be a minimum received signal strength indicator that specifies a minimum signal strength requirement for communications occurring using the current antenna. If the determination is made using an RSSI for the current antenna, for example, the threshold may be 57 dB, although different thresholds may be utilized for different device implementations.

If the communication conditions on the current antenna exceed the minimum signal strength threshold, indicating that the communication conditions are sufficient to continue using the current antenna, the method moves to step 606 and sleeps for a period of time until method 600 is re-executed.

The sleep period of time associated with step 606 is generally configurable and is typically set based upon the type and application of the device. If, for example, the device is a smart speaker that is moved relatively infrequently with respect to the device's access point, the sleep period of time may be relatively high (e.g., 60 minutes or greater). But if, for example, the device is portable or mobile so that the device is more likely to move with respect to its access points or more frequently change access points, the sleep time may be set to a shorter duration (e.g., 5 minutes, 1 minutes, etc.) to account for those more-rapidly changing communication conditions. Each time the method is re-executed after sleeping, as indicated by step 608, the controller resets a counter ("current run"). As described below, the counter is used to limit the number of times particular internal logic loops of method 600 are executed before the method sleeps in step 606.

If, however, in step 604 the controller determines that the communication conditions via the current antenna are not sufficient (e.g., a RSSI for transmissions received by the current antenna falls below a threshold), the controller will, potentially, initiate an antenna switch. Before doing so, the controller determines whether switching to an alternate antenna would improve communication conditions.

But before testing the communication conditions on the device's alternate antenna, in step 610 the controller determines whether a defined network-level activity is in process. As discussed above, this evaluation may involve a radio controller (e.g., radio controller 404) communicating with an application processor (e.g., application processor 402) to determine whether such activities are underway.

Generally, step 610 involves determining whether any defined network-level activities are in process, where the activities are associated with protocols that could be affected by the upcoming antenna switch. As such, in a device where all communication protocols are tied together so that all protocols use the same antenna at the same time, such an antenna switch could potentially affect all protocols. Accordingly, step 610 will involve determining whether any of the device's defined network-level activities are in process (i.e., all activities defined within Table 1, above).

If, however, the device includes a switch that enables different protocols to be transmitted through different antennas, such as switch 414 of FIG. 4, an antenna switch may not affect communications using all protocols of the device. For example, in a device that implements both WIFI and BLUETOOTH protocols, but also includes a switch enabling antenna switches to be performed for only a single protocol, step 610 may only involve determining whether defined network-level activities are in process for the protocol being switched. Accordingly, if method 600 is implemented for WIFI communications for such a device, step 610 may only involve checking whether the defined network-level activities listed in Table 1 that are also associated with the WIFI protocol are in process. Activities associated with the BLUETOOTH protocol will not be evaluated.

To facilitate determining whether a particular defined network-level activity is in process, each activity may be associated with a particular process or executable file within the device. In that case, to determine whether a particular activity is in process, the controller may determine whether the process or executable file has been executed and is currently running within the device (e.g., by application processor 402). In other examples, each activity may be associated with a particular program. The program may include an application program interface enabling an application processor (e.g., application processor 402) to access the application program interface to determine whether the program is executing the specific activity. In still other embodiments, the table storing the listing of defined network-level activities may identify a particular log file that an application processor may access to determine whether the activity is in process. In a specific example, if a DHCP process is defined as a network-level activity, application processor 402 may be configured to interface with a DHCP daemon configured to implement the DHCP process. By directly inspecting the DHCP daemon (e.g., via an API), the application processor 402 can determine whether DHCP is in process. Similarly, application processor 402 may determine whether a network-level activity of a WPA handshake is in processor by listening for wpa_supplicant events that signal an initiation of a layer-2 association, a completion of layer-2 association, and a completion of the WPA handshake. To identify whether BLUETOOTH-related network-level activities are in-process, application processor 402 can be configured to directly inspect (e.g., via a suitable API call) the device's BLUETOOTH subsystem to determine whether a defined BLUETOOTH profile has been instantiated—indicating that a particular network-level activity is in process. Similarly, to determine whether a whole home audio (WHA)-related network-level activity is in process, application processor 402 may be configured to inspect the device's WHA state machine to determine whether a WHA distribution session is in process.

If such defined network-level activities are in process, the antenna switch process is interrupted and the method returns to step 606 to sleep for a period time until method 600 is re-executed.

If no defined network-level operations are in process, the controller initiates an antenna switch in step 612 (e.g., by switching away from the current antenna that is experiencing poor communication conditions per step 604 to an alternate antenna within the device). This antenna switch enables the controller to determine whether radio conditions are improved on the alternate antenna. Step 612 is executed to allow communication condition sampling to occur on the alternate antenna. The details of step 612 are shown in FIG. 7.

Figure 7:
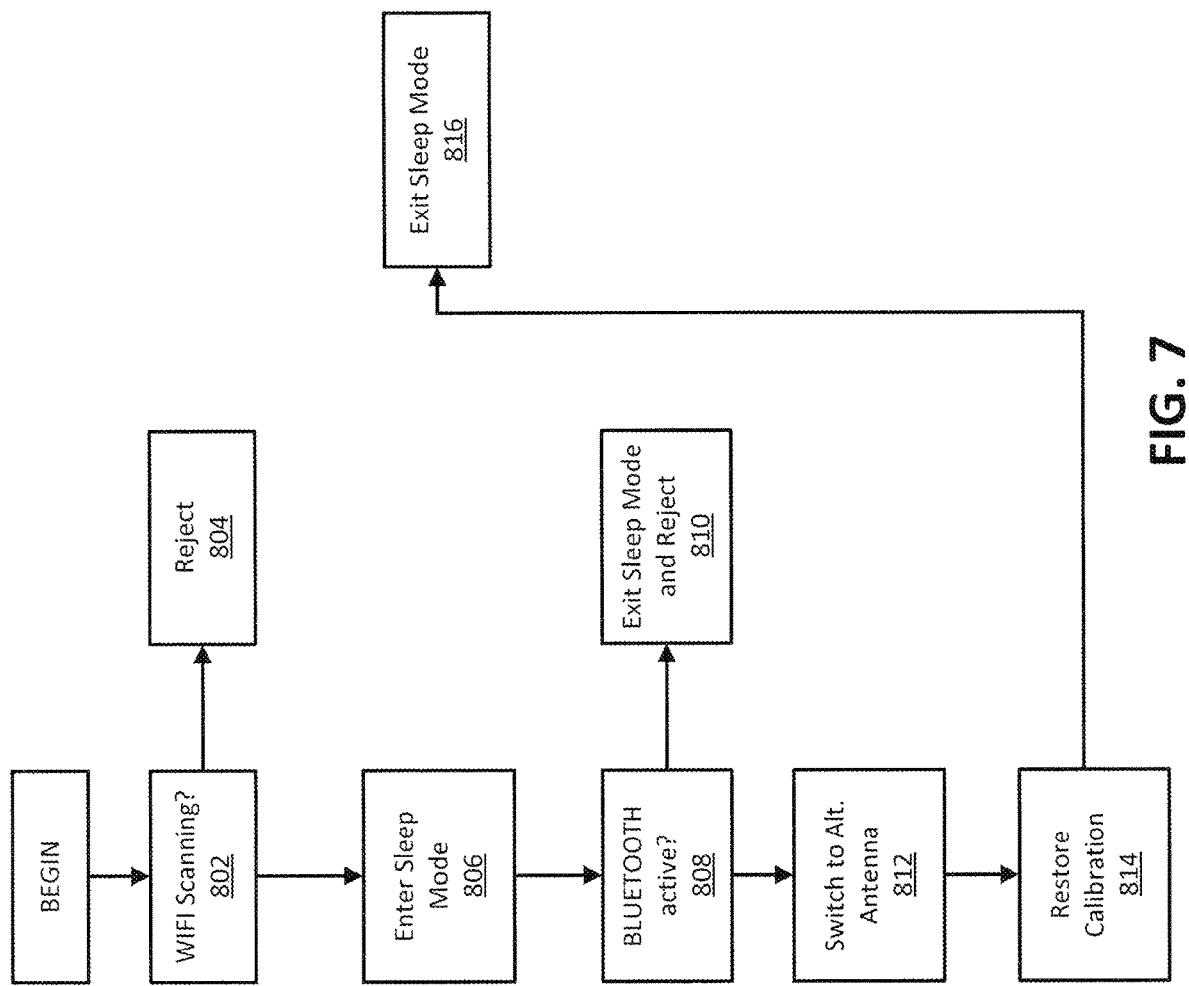
FIG. 7 is a flowchart depicting a method for implementing an antenna switch to sample communication conditions on a device's alternate antenna.

FIG. 7 is a flowchart depicting method 700 for implementing an antenna switch in order to sample communication conditions on the device's alternate antenna. The method is described in terms of the steps that would be executed at least partially by a WIFI radio controller, where the device also includes a BLUETOOTH controller. But it should be understood the method may be executed by a radio controller implementing any communication protocol. In step 702, the radio controller determines whether the current radio controller (e.g., the WIFI radio controller) is already implementing communication condition scanning. This step may involve the radio controller inspecting a network driver of the device to determine whether the network driver is actively implementing a communication condition scanning activity. If so, the method moves to step 704 and rejects the present antenna switch so that the scanning that is already underway can continue. At this time, the radio controller may also determine whether the WIFI radio controller is currently idle or has been idle for a time threshold indicating that the WIFI radio controller is not currently processing communications for transmission via the current antenna. The radio controller is idle if the controller has not transmitted or received messages or data for a threshold period of time. Accordingly, step 704 may involve, for example, determining that the WIFI controller has not taken any actions to encode or decode packets for transmissions through the antenna or received through the antenna for a threshold period of time (e.g., 5 seconds). If the WIFI controller has not been idle for the threshold period of time, the method can move to step 704 and reject the present antenna switch.

If scanning is not already underway, in step 706 the radio controller transmits a notification (i.e., a sleep command) to the device's connected access point that the device is entering a sleep mode. This sleep mode instruction causes the access point to begin buffering communications that are received at the access point with a target destination of the device. By notifying the access point that the device is entering a sleep mode (and causing the access point to begin buffering those communications), the radio controller ensures that communications to the device are not lost or otherwise fail to be delivered to the device while the radio controller implements an antenna switch. If the radio controller is implementing a communication protocol other than WIFI (as is the case in this example), alternative sleep instructions may be utilized that similarly operate to cause the network to buffer communications ensuring data is not lost during an antenna switch process.

In step 708, the radio controller determines whether other radio controllers for other communication protocols that may be affected by the antenna switch are active and in the process of executing communication protocol-level critical activities. The output of the other radio controllers, for example, may be tied to the output of the WIFI radio controller so that if the WIFI radio controller switches antennas, the antenna also switches for those other radio controllers, too. In this example, the BLUETOOTH radio controller could be affected by an antenna switch performed by the WIFI controller. Accordingly, in step 708 the radio controller determines whether the BLUETOOTH controller is executing a BLUETOOTH protocol-level critical activity. Such activities may involve BLUETOOTH inquiry, page scanning, or pairing processes. In other embodiments, though, whether the device includes other radio controllers, step 708 may involve determining that the other radio controllers are not in a device inquiry scan state or a page scan state (together referred to herein as device scan states). Device scan states may include states where a radio controller activates its communication interface in an attempt to listen for inquiry or paging messages transmitted by remote devices, The inquiry or paging messages may be used to assist remote devices in identifying other nearby devices that can communicate using the protocol used to transmit the inquiry or paging messages.

At this time, the radio controller may also determine whether the BLUETOOTH radio controller is currently idle or has been idle for a time threshold indicating that the BLUETOOTH radio controller is not currently processing communications for transmission via the current antenna. The radio controller is idle if the controller has not transmitted or received messages or data for a threshold period of time. Accordingly, step 704 may involve, for example, determining that the BLUETOOTH controller has not taken any actions to encode or decode packets for transmission through the antenna or received through the antenna for a threshold period of time (e.g., 5 seconds). If the BLUETOOTH controller has not been idle for the threshold period of time, the method can move to step 710 and reject the present antenna switch.

It should be noted that the critical condition looked for in step 708 may not include the full set of activities defined as defined network-level activities, described above. Defined network-level activities may be occurring at the application level within an application processor (e.g., application processor 402 of FIG. 4) and have already investigated in step 610 of FIG. 6, above. Instead, the critical condition looked for in step 708 may be limited to a condition occurring within the BLUETOOTH radio controller itself.

If a critical condition is detected in step 708, the method moves to step 710 where the method is aborted. The radio controller exits the sleep mode by transmitting an instruction to the access point that the device is exiting sleep mode and then ends the method by rejecting the antenna switch.

But if no critical condition is detected in step 708, the radio controller switches antennas to the device's alternate antenna in step 712 and then initiates testing the communication conditions for the alternate antenna in step 714. To test communication conditions, the radio controller may transmit a probe message via the alternate antenna. Responsive to the probe message, the radio controller receives responses containing data (e.g., a RSSI or SNR contained within a probe response) describing the quality of the communication conditions via the alternate antenna. Upon receiving the data responsive to the probe message, in step 716 the radio controller determines that the scan is complete and stores the received communication condition data for the alternate antenna.

With the scan on the alternate antenna complete, the radio controller attempts to switch back to the first or main antenna (i.e., the "current" antenna at the time method 700 was initially executed). Accordingly, in step 718, before that antenna switch occurs, the radio controller again determines whether other radio controllers for other communication protocols that may be affected by the antenna switch are in the process of executing communication protocol-level critical activities. If such a condition occurs, the radio controller executes a wait loop via step 720, in which, up to maximum wait time, the radio controller will periodically (e.g., every 1, 5, or 10 milliseconds) re-execute step 710 to determine whether the critical condition has ended. When the condition has ended (or the maximum wait time (e.g., 30, 40, or 100 milliseconds)), the radio controller will, in step 724 switch back to using the first or main antenna. In step 726 the radio controller exits sleep mode by notifying the access points of the same. Finally, in step 728 the method ends with the radio controller reporting the communication condition data gathered during the scanning process of steps 714 and 716.

Returning to FIG. 6, having completed the antenna switch and communication condition scan of step 612, in step 614 the controller evaluates the outcome of step 612.

If the antenna switch and scan of step 612 was not successful (i.e., the outcome was the rejected state of steps 704 or 710 of method 700), the method repeats. Specifically, in step 616, the controller determines whether the value of the current run exceeds a maximum threshold value (e.g., a value of 3, though other values may be used depending upon the device implementation). If the current run counter exceeds the maximum threshold value, the method moves to step 606 to sleep for a period of time. Following the sleep time, the value of the current run counter will be reset and the method will be re-executed. But if the maximum threshold value has been determined to not be exceeded in step 616, the value of the current run counter is incremented in step 618 and the method will be immediately re-executed.

If the antenna switch and scan of step 612 was successful (i.e., the method ended at step 726), in step 620 the controller determines whether the communication conditions on the alternate antenna (as determined in step 612) are better than those of the current antenna (as determined in step 604). This may involve determining, for example, whether the RSSI for the current antenna is greater than the RSSI measured for the alternative antenna, which would indicate that communication conditions are better on the current antenna than the alternate antenna.

Figure 8:
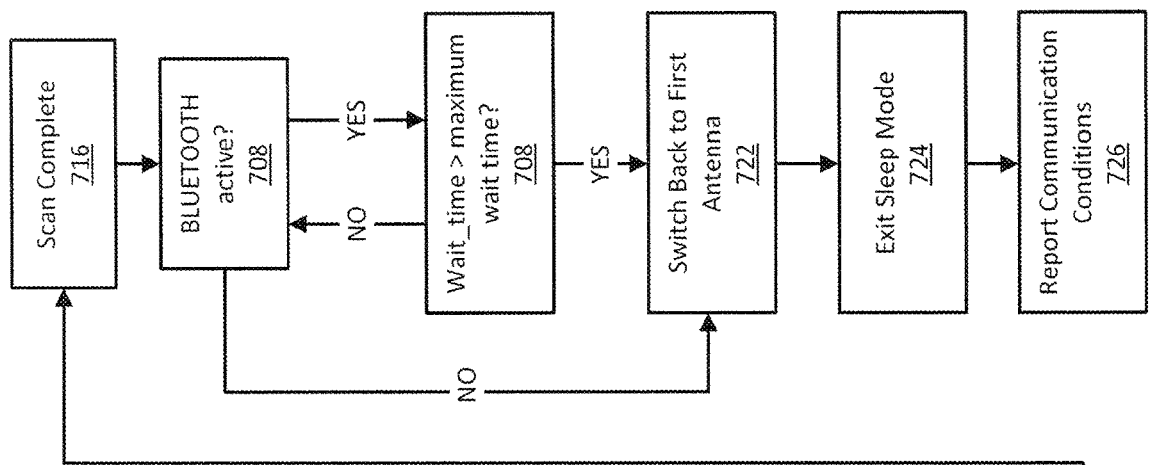
FIG. 8 is a flowchart depicting a method for implementing an antenna switch.
Figure 8:
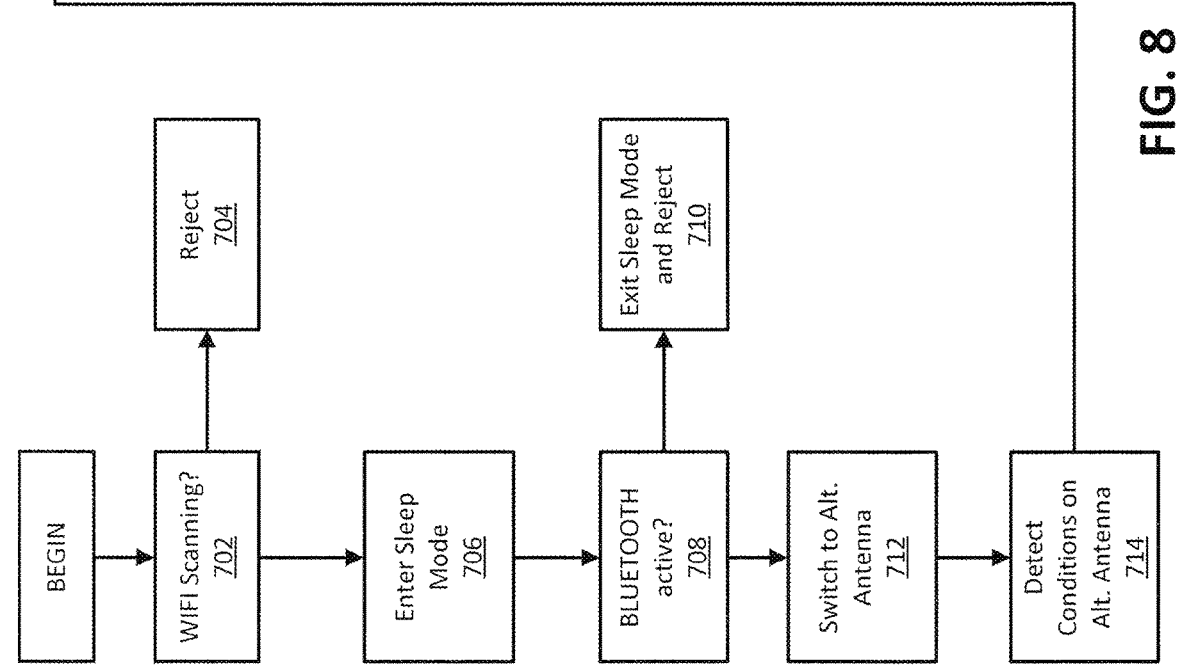

If it is determined in step 620 that the communication conditions on the alternate antenna are not better than those on the current antenna, the method returns to step 606 and sleeps for a period of time, with communications continuing via the first or current antenna. But if conditions on the alternate antenna are better than those on the current antenna (or are better by some threshold value), the method moves to step 622 to initiate a switch to the alternate antenna—details of step 622 are illustrated in FIG. 8 and described below. After the switch is performed, the method returns to step 606 and sleeps for a period of time.

FIG. 8 is a flowchart depicting method 800 for implementing an antenna switch. The method is described in terms of the steps that would be executed by a WIFI radio controller, where the device also includes a BLUETOOTH controller. But it should be understood the method may be executed by a radio controller implementing any communication protocol. In step 802, the radio controller determines whether the current radio controller (e.g., the WIFI radio controller) is already implementing communication condition scanning. If so, the method moves to step 804 and rejects the present antenna switch so that the scanning that is already underway can continue. At this time, the radio controller may also determine whether the WIFI radio controller is current idle or has been idle for a time threshold indicating that the WIFI radio controller is not currently processing communications for transmission via the current antenna. This may involve, for example, determining that the WIFI controller has not taken any actions to encode or decode packets for transmissions through the antenna or received through the antenna for a threshold period of time (e.g., 5 seconds). If the WIFI controller has not been idle for the threshold period of time, the method can move to step 804 and reject the present antenna switch.

If scanning is not already underway, in step 806 the radio controller transmits a notification to the device's connected access point that the device is entering a sleep mode. The sleep mode is a generic instruction that causes the access point to begin buffering communications that are received at the access point with a target destination of the device. By notifying the access point that the device is entering a sleep mode (and causing the access point to begin buffering), the radio controller ensures that communications to the device are not lost or otherwise fail to be delivered to the device while the radio controller implements an antenna switch. If the radio controller is implementing a communication protocol other than WIFI (as is the case in this example), alternative sleep instructions may be utilized that similarly operate to cause the network to buffer communications ensuring data is not lost during an antenna switch process.

In step 808, the radio controller determines whether other radio controllers for other communication protocols that may be affected by the antenna switch are in the process of executing communication protocol-level critical activities. The output of the other radio controllers, for example, may be tied to the output of the WIFI radio controller so that if the WIFI radio controller switches antennas, the antenna also switches for those other radio controllers, too. In this example, the BLUETOOTH radio controller could be affected by an antenna switch performed by the WIFI controller. Accordingly, in step 808 the radio controller determines whether the BLUETOOTH controller is executing a BLUETOOTH protocol-level critical activity. BLUETOOTH protocol-level critical activities may include BLUETOOTH inquiry, page scanning, or pairing processes.

In other embodiments, though, whether the device includes other radio controllers, step 708 may involve determining that the other radio controllers are not in a device inquiry scan state or a page scan state (together referred to herein as device scan states). Device scan states may include states where a radio controller activates its communication interface in an attempt to listen for inquiry or paging messages transmitted by remote devices, The inquiry or paging messages may be used to assist remote devices in identifying other nearby devices that can communicate using the protocol used to transmit the inquiry or paging messages. At this time, the radio controller may also determine whether the BLUETOOTH radio controller is current idle or has been idle for a time threshold indicating that the BLUETOOTH radio controller is not currently processing communications for transmission via the current antenna. This may involve, for example, determining that the BLUETOOTH controller has not taken any actions to encode or decode packets for transmission through the antenna or received through the antenna for a threshold period of time (e.g., 5 seconds). If the BLUETOOTH controller has not been idle for the threshold period of time, the method can move to step 810 and reject the present antenna switch.

It should be noted that the critical condition looked for in step 808 may not include the full set of defined network-level activities, described above. Defined network-level activities may be occurring at the application level within an application processor (e.g., application processor 402 of FIG. 4) and have already been investigated in step 610 of FIG. 6, above. Instead, the critical condition looked for in step 808 is limited to a condition occurring within the BLUETOOTH radio controller itself.

If a critical condition is detected in step 808, the method moves to step 810 where the method is aborted. The radio controller exits the sleep mode by transmitting an instruction to the access point that the device is exiting sleep mode and then ends the method by rejecting the antenna switch.

But if no critical condition is detected in step 808, the radio controller switches antennas to the device's alternate antenna in step 812. For example, the radio controller may operate a switch (e.g., switch 414 of FIG. 4) to causes communications to occur via the alternate antenna. Having switched antennas, in step 814, the controller restores calibration on the alternate antenna. Step 814 may involve retrieving previously-saved antenna calibration information for the alternate antenna, and using the calibration information to calibrate the antenna, thereby enabling wireless communication to be effected using the alternate antenna. In step 816 the radio controller exits sleep mode by notifying the access points of the same and the method ends.

In an embodiment, a device includes a first radio controller configured to implement a wireless fidelity communication protocol, a second radio controller configured to implement a BLUETOOTH communication protocol, a first antenna configured to electrically connect to the first radio controller and the second radio controller, and a second antenna configured to electrically connect to the first radio controller and the second radio controller. The device includes a processor that is configured to execute instructions for determining, using the first radio controller, a first received signal strength indicator of a first radio frequency signal received from an access point by the first antenna, determining that the first received signal strength indicator is less than a threshold received signal strength indicator for communications via the first antenna, and determining that the processor is not executing a dynamic host configuration protocol process using the first radio controller and that the processor is not executing a BLUETOOTH pairing process. The processor is configured to execute instructions for determining, using the first radio controller, a second received signal strength indicator of a second radio frequency signal received from the access point by the second antenna, determining that the second received signal strength indicator is greater than the first received signal strength indicator, and causing the first radio controller and the second radio controller to communicate using the second antenna.

In another embodiment, a device includes a first radio controller, a second radio controller, and a processor. The processor is configured to execute instructions for determining that a first signal strength of a signal received from a remote device by a first antenna electrically connected to the first radio controller is less than a minimum signal strength threshold for communications using the first antenna, identifying a network process configured to communicate with a remote device using the first radio controller or the second radio controller, determining that the processor is not executing the network process, determining a second signal strength of a second signal received from the remote device by a second antenna, determining the second signal strength is greater than the first signal strength, and causing the first radio controller to communicate using the second antenna.

In another embodiment, a device includes a first radio controller, a second radio controller, a first antenna, and a second antenna. The device includes a switch including a first input connected to the first radio controller, a second input connected to the second radio controller, a first output connected to the first antenna, and a second output connected to the second antenna. The device includes a processor configured to execute instructions for operating the switch to electrically connect the first radio controller to the first antenna and electrically connect the second radio controller to the first antenna, determining that the processor is not executing a network process to communicate with a remote device using the first radio controller, and operating the switch to electrically connect the first radio controller to the second antenna.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A device, comprising:
a first radio controller configured to implement a wireless fidelity communication protocol;
a second radio controller configured to implement a BLUETOOTH communication protocol;
a first antenna configured to electrically connect to the first radio controller and the second radio controller;
a second antenna configured to electrically connect to the first radio controller and the second radio controller; and
a processor that is configured to execute instructions for:
determining, using the first radio controller, a first received signal strength indicator of a first radio frequency signal received from an access point by the first antenna,
determining that the first received signal strength indicator is less than a threshold received signal strength indicator for communications via the first antenna,
determining that the processor is not executing a dynamic host configuration protocol process using the first radio controller and that the processor is not executing a BLUETOOTH pairing process,
in response to determining that the processor is not executing the dynamic host configuration protocol process or the BLUETOOTH pairing process, determining, using the first radio controller, a second received signal strength indicator of a second radio frequency signal received from the access point by the second antenna,
determining that the second received signal strength indicator is greater than the first received signal strength indicator, and
causing the first radio controller and the second radio controller to communicate using the second antenna.

2. The device of claim 1, wherein the processor is further configured to execute instructions for, prior to determining the second received signal strength indicator of the second radio frequency signal, determining that the second radio controller is not actively listening for transmissions from remote devices.

3. The device of claim 1, wherein the processor is further configured to execute instructions for, prior to determining the second received signal strength indicator of the second radio frequency signal, causing the first radio controller to transmit a message to the access point, the message indicating that the device is entering a sleep mode and causing the access point to buffer communications addressed to the device.

4. The device of claim 1, wherein the processor is further configured to execute instructions for, before determining, using the first radio controller, the second received signal strength indicator of the second radio frequency signal, determining that the first radio controller has not transmitted or received a message for a first time threshold and determining that the second radio controller has not transmitted or received a message for a second time period that exceeds a second time threshold.

5. A device, comprising:
a first radio controller;
a second radio controller; and
a processor that is configured to execute instructions for:
determining that a first signal strength of a signal received by a first antenna electrically connected to the first radio controller is less than a minimum signal strength threshold for communications using the first antenna,
identifying a network process configured to communicate with a remote device using the first radio controller or the second radio controller,
upon determining that the first signal strength is less than the minimum signal strength threshold, determining that the processor is not executing the network process,
upon determining that the processor is not executing the network process, causing the first radio controller to switch from being connected to the first antenna to being connected to a second antenna,
upon causing the first radio controller to switch from being connected to the first antenna to being connected to the second antenna, determining a second signal strength of a second signal received from the remote device by the second antenna,
determining the second signal strength is greater than the first signal strength, and
causing the first radio controller to communicate using the second antenna.

6. The device of claim 5, further comprising:
a switch including a first input, a second input, a first output, and a second output and wherein the first radio controller is electrically connected to the first input, the second radio controller is electrically connected to the second input, the first output is connected to the first antenna and the second output is electrically connected to the second antenna,
wherein the processor is further configured to execute instructions for causing the first radio controller to communicate using the second antenna by operating the switch to electrically disconnect the first radio controller from the first antenna and electrically connect the first radio controller to the second antenna.

7. The device of claim 6, wherein the processor is further configured to execute instructions for operating the switch to electrically connect the first radio controller to the second antenna and the second radio controller to the first antenna.

8. The device of claim 5, wherein the processor is further configured to execute instructions for, before determining the second signal strength of the second signal received using the second antenna, causing the first radio controller to transmit a message to the remote device to cause the remote device to buffer communications addressed to the device.

9. The device of claim 5, wherein the processor is further configured to execute instructions for, before determining the second signal strength, determining that the second radio controller is not actively scanning for messages transmitted by remote devices.

10. The device of claim 5, wherein the processor is further configured to execute instructions for, before determining the second signal strength, determining that the first radio controller has not transmitted or received data for a first time threshold and determining that the second radio controller has not transmitted or received data for a second time threshold.

11. The device of claim 5, wherein the processor is further configured to execute instructions for comparing the second signal strength to the first signal strength by determining that the second signal strength exceeds the first signal strength by a signal strength threshold.

12. The device of claim 5, wherein the first radio controller is configured to implement a wireless fidelity communication protocol and the second radio controller is configured to implement a BLUETOOTH communication protocol.

13. A device, comprising:
a first radio controller;
a second radio controller;
a first antenna;
a second antenna;
a switch including a first input connected to the first radio controller, a second input connected to the second radio controller, a first output connected to the first antenna, and a second output connected to the second antenna; and
a processor configured to execute instructions for:
operating the switch to electrically connect the first radio controller to the first antenna and electrically connect the second radio controller to the first antenna,
determining that a first signal strength of a signal received by the first antenna is less than a minimum signal strength threshold for communications using the first antenna;
upon determining that the first signal strength is less than the minimum signal strength threshold, determining that the processor is not executing a network process to communicate with a remote device using the first radio controller, and
upon determining that the processor is not executing the network process, operating the switch to electrically connect the first radio controller to the second antenna.

14. The device of claim 13, wherein the processor is further configured to execute instructions for, before operating the switch to electrically connect the first radio controller to the second antenna, comparing a communication condition of the first antenna to a communication condition of the second antenna by:
determining a first signal strength of a first signal received by the first antenna;
determining a second signal strength of a second signal received by the second antenna; and
determining that the first signal strength is less than the second signal strength.

15. The device of claim 14, wherein the processor is further configured to execute instructions for, before comparing the communication condition of the first antenna to the communication condition of the second antenna, causing the first radio controller to transmit a message to a remote device to cause the remote device to buffer communications addressed to the device.

16. The device of claim 15, wherein the processor is further configured to execute instructions for, before comparing the communication condition of the first antenna to the communication condition of the second antenna, determining that the second radio controller is not in a device scan state.

17. The device of claim 15, wherein the processor is further configured to execute instructions for, after causing the first radio controller to transmit the message to the remote device to cause the remote device to buffer communications addressed to the device:
determining that the second radio controller is in a device scan state; and
causing the first radio controller to transmit a second message to the remote device to cause the remote device to stop buffering communications addressed to the device.

18. The device of claim 15, wherein the processor is further configured to execute instructions for, before comparing the communication condition of the first antenna to the communication condition of the second antenna, determining that the first radio controller is idle and determining that the second radio controller is idle.

19. The device of claim 13, wherein the processor is further configured to execute instructions for, before determining that the processor is not executing a network process to communicate with a remote device using the first radio controller, determining that a signal strength of a signal received from a remote device point by the first antenna is less than a signal strength threshold.

20. The device of claim 13, wherein the first radio controller is configured to implement a wireless fidelity communication protocol and the second radio controller is configured to implement a BLUETOOTH communication protocol.

* * * * *